United States Patent [19]
Chen et al.

[11] Patent Number: 5,421,737
[45] Date of Patent: Jun. 6, 1995

[54] UNIVERSAL EJECTOR MECHANISM FOR AN IC CARD CONNECTOR APPARATUS

[75] Inventors: Liu-Yuan Chen, Kaohsiung; Yu-Wen Chen, Taipei, both of Taiwan, Prov. of China; Nai K. Wong, Singapore, Singapore

[73] Assignee: Molex Incorporated, Lisle, Ill.

[21] Appl. No.: 208,397

[22] Filed: Mar. 9, 1994

[51] Int. Cl.⁶ .......................................... H01R 13/62
[52] U.S. Cl. ..................................... 439/157; 439/159
[58] Field of Search ............................. 439/152–160, 439/372, 341, 928, 326–328

[56] References Cited

U.S. PATENT DOCUMENTS

| | | | |
|---|---|---|---|
| 4,952,161 | 8/1990 | Komatsu | 439/159 |
| 5,026,296 | 6/1991 | Hashiguchi | 439/159 |
| 5,139,435 | 8/1992 | Komatsu | 439/159 |
| 5,197,894 | 3/1993 | Koike | 439/159 |
| 5,286,214 | 2/1994 | Takahashi | 439/159 |
| 5,299,089 | 3/1994 | Lwee | 439/159 |
| 5,324,204 | 6/1994 | Lwee | 439/159 |

*Primary Examiner*—David L. Pirlot
*Attorney, Agent, or Firm*—Stacey E. Caldwell

[57] ABSTRACT

An ejector mechanism is provided for ejecting an IC card from a header connector which has a mating end, a terminating end and first and second opposite sides extending between the ends. A generally L-shaped ejector frame is adapted to be mounted about the header connector with a base leg of the L-shaped frame along the terminating end of the header connector and a side leg along one side of the header connector. The side leg has a channel therein. An ejector lever is pivotally mounted on at least one of the header connector or the ejector frame and has a first lever end and a second lever end. The second lever end is adapted to eject the IC card from the header connector. An elongated pushrod is reciprocally mounted in the channel and has a first rod end pivotally associated with the first lever end of the ejector lever and a second rod end for manual actuation to effect pivoting of the eject lever and ejection of the IC card. The ejector frame is adapted to be mounted with the side leg thereof along either the first or second opposite sides of the header connector. Therefore, the ejector frame and push-rod can be used as either a "right-hand" or a "left-hand" ejector mechanism without altering the header connector.

10 Claims, 6 Drawing Sheets

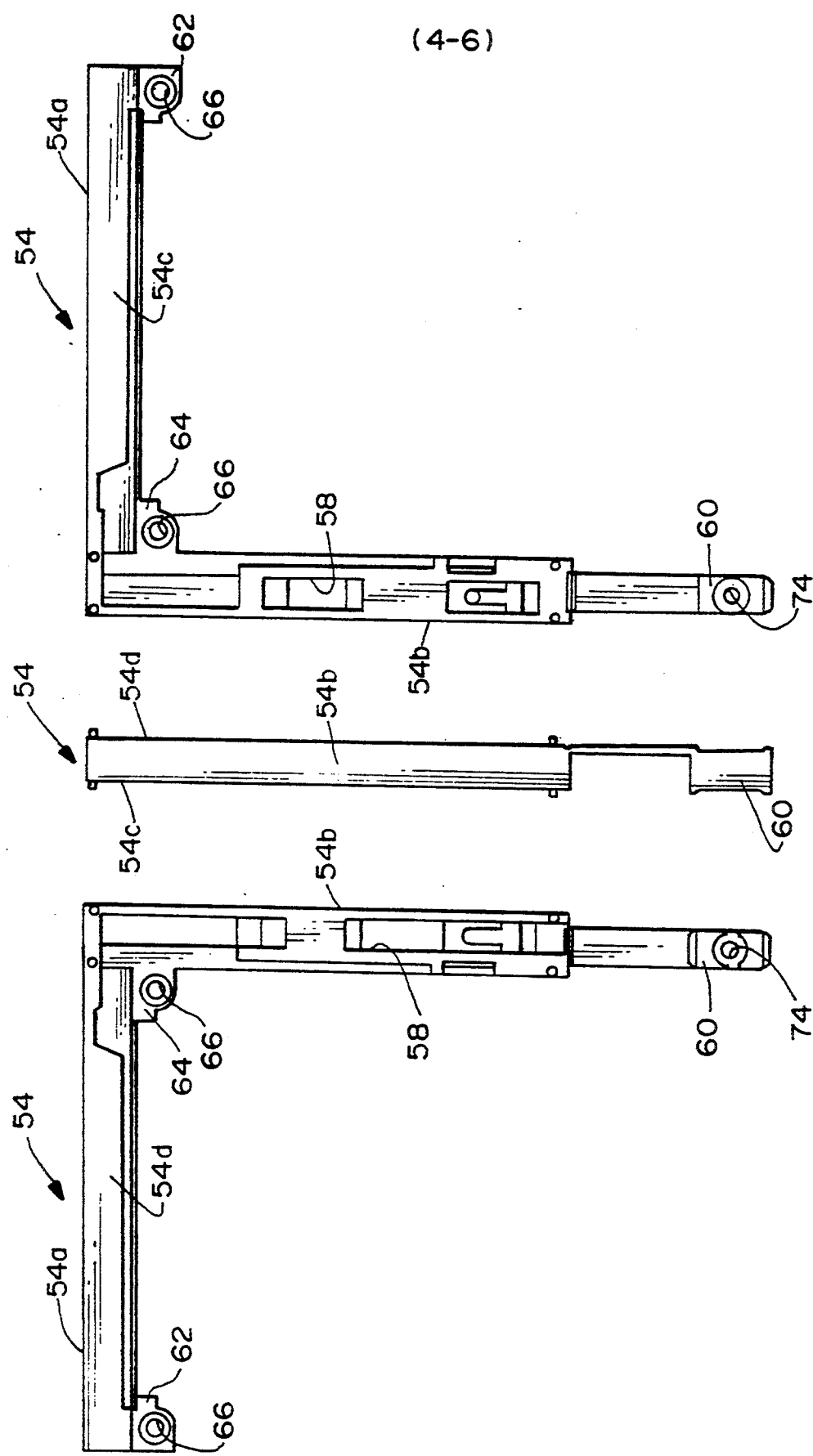

UNIVERSAL EJECTOR MECHANISM FOR AN IC CARD CONNECTOR APPARATUS

FIELD OF THE INVENTION

This invention generally relates to the art of electrical connectors and, particularly, to an ejector mechanism for ejecting an IC card from a header connector, the mechanism being adaptable for use with a variety of header connector configurations.

BACKGROUND OF THE INVENTION

Generally, IC cards or packs, such as memory cards, are data input devices which are electrically connected to an electronic apparatus or storage device, such as a word processor, personal computer, or other electronic apparatus. The data stored in the IC card is transferred to the electronic apparatus. Memory cards are portable instruments which are readily inserted and extracted from a connector apparatus, such as a header connector, which may be used with the IC card for removably coupling the IC card to a printed circuit board, for instance.

A conventional connector apparatus for an IC pack or memory card includes a generally U-shaped frame having a pair of guide grooves inside a pair of side frame portions, with a connector section joining or extending between the side frame portions. Generally, the connector apparatus defines a terminating end and a mating end, the mating end including the guide grooves. A planar IC card is inserted into the apparatus within the side guide grooves. A transverse array of socket terminals at a lead edge of the IC card electrically connect an associated array of pin terminals on the connector section.

Such connector apparatus often are provided as header connectors used for interconnecting the semiconductor circuit of the IC card to an external circuit such as a main electronic unit. The header connector may be used with an IC card for removably coupling the IC card to a printed circuit board. The IC card is inserted into the header connector and is extracted therefrom as needed. The extraction force of the IC card, i.e. the force between the respective terminal pins on the header connector and the respective socket terminals on the IC card, is relatively high due to the tight fit required to obtain a good electrical interconnection between the terminals. These terminals typically are disposed at a high density which further increases the extraction forces. Originally, when an IC card was to be extracted from a header connector, the card was grasped by a user and simply pulled out.

A variety of ejector mechanisms have been incorporated in various connector apparatus, such as the header connectors, for facilitating ejection of the IC card from the connector. Such ejector mechanisms have been incorporated as integral or unitary devices fabricated as a part of the connector apparatus or header connector, itself. Such assemblies or systems have proven quite expensive and elaborate. On the other hand, separate ejector mechanisms have been provided for assembly or mounting to or about the header connector, such as after the header connector has been coupled to a printed circuit board.

A typical IC card ejector mechanism includes at least an ejector frame for mounting about the header connector. An eject lever is mounted either on the ejector frame, the header connector or therebetween. The eject lever is adapted to engage and eject the IC card from the header connector. A push-rod is slidably or reciprocally mounted on the ejector frame for actuating the eject lever.

A problem which presently exists in the industry involving IC cards, header connectors and ejector mechanisms for electronic use is the lack of any conventional or universal components. This invention is directed to solving these problems by providing an ejector mechanism which has a single "universal" card ejector frame and push-rod for use with various header connectors, and ejector configurations.

Specifically, although the method or type of ejection (e.g. a card tray or direct contact with the card) differs from manufacturer to manufacturer, some industry-wide standards (e.g. "PCMCIA") and or practices define certain features such as card/header polarization, card and connector packaging dimensions, ESD/-grounding features and the like. For example, the standard insertion direction of a typical IC card is "printed side up" which requires polarizing means to ensure proper insertion when the header is mounted on the upper surface of a printed circuit board. Such a configuration is referred to as a "standard" type of header orientation. When the header connector is mounted on the lower surface of the printed circuit board, and the polarization of the card and the header remains the same (i.e. the card is inserted "printed side up"), the configuration of the header is now referred to as a "reverse" type due to the different configuration of the header with respect to the underlying mounting surface. In addition to the type of configuration based on polarization and mounting surface, users may have a preference as to where the eject button (i.e. push-rod) of the ejector mechanism is located. In other words, the eject button may be on the left side or the right side of the header. Therefore, where the header is mountable on the upper surface or the lower surface of a printed circuit board, the user has an option of having the push-button on the left side or the right side of the header in either of the "standard" type header configuration or the "reverse" type header configuration.

Because of the myriad of options described above, and because there is no standard dictating either the position of the push-button or the orientation/polarization of the IC card, a manufacturer inventories a number or variety of ejector frames, push-buttons, levers and headers to satisfy customer demands. This requires design and building of a considerable number of separate molds and other tooling as well as inventory of a variety of parts and options. It is readily apparent that such options become very costly. This invention is directed to eliminating these various problems.

SUMMARY OF THE INVENTION

An object, therefore, of the invention is to provide a new and improved ejector mechanism, particularly a "universal" mechanism, for ejecting an IC card from a header connector, such as a header mounted on a printed circuit board.

In the exemplary embodiment of the invention, the ejector mechanism includes a generally L-shaped ejector frame having an upper face and a lower face. The frame is adapted to be mounted in a first position about the header connector with its lower face on the printed circuit board. The frame has an integrally formed channel located along one side of the header connector. An eject lever is pivotally mounted on the ejector frame and has a first lever end and a second lever end. The second lever end is adapted to engage and eject the IC card from the header connector. An elongated push-rod is reciprocally mounted in the channel and has a first rod end pivotally associated with the first lever end of the eject lever and a second rod end for manual actuation to effect pivoting of the eject lever and consequent ejection of the IC card.

The invention contemplates the provision of means for mounting the ejector frame in a second position about the header connector with the upper surface of the frame on the printed circuit board and the integrally formed channel and push-rod located along the opposite side of the header connector. Therefore, the ejector frame and push-rod can be used either as a "right-hand" or a "left-hand" ejector mechanism without altering the header connector.

Generally, the invention contemplates that the ejector frame and the header connector have complementary interengaging mounting means for mounting the frame and the header connector to the printed circuit board. The mounting means are interengageable in either of the first or second positions of the ejector frame. In other words, the means for mounting the ejector frame in the second position also comprise the means for mounting the ejector frame in the first position.

The channel in the frame is constructed and dimensioned to be located entirely within the bounds of the upper and lower faces of the ejector frame which define a given thickness of the frame. The push-rod is constructed and dimensioned to be disposed entirely within that given thickness. Preferably, the ejector frame is a one-piece structure unitarily molded of plastic material.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3A is a top plan view of the ejector frame and push-rod in a right-hand orientation;

FIG. 3B is a side elevational view looking toward the right-hand side of FIG. 3A;

FIG. 3C is a top plan view of the ejector frame and push-rod in a left-hand orientation;

DETAILED DESCRIPTION OF THE PREFERRED EMBODIMENT

Figure 1:
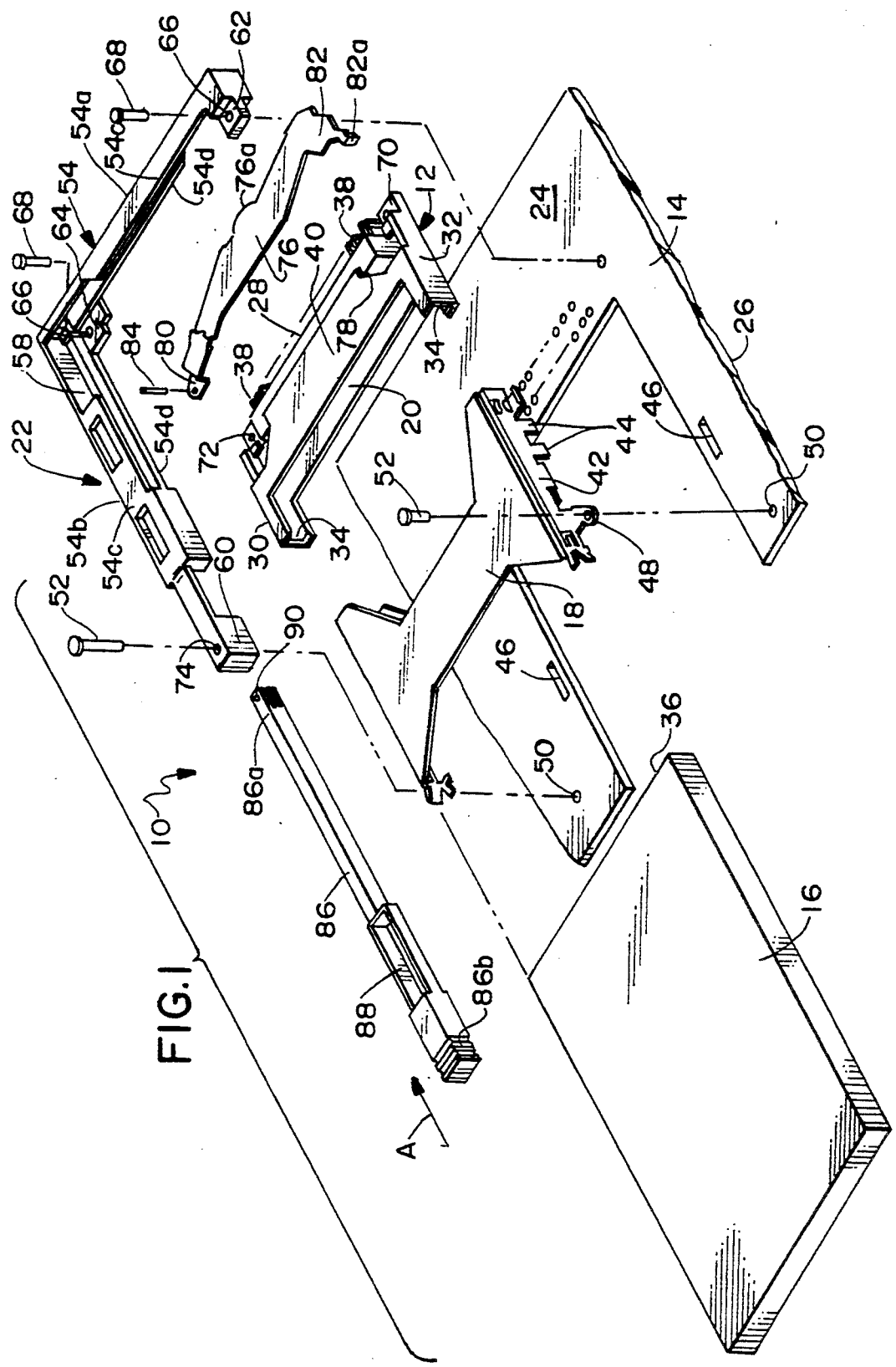
FIG. 1 is an exploded perspective view of a connector apparatus which includes a header connector mounted on a printed circuit board for receiving an IC card, and including the ejector mechanism of the invention.

Referring to the drawings in greater detail, and first to FIG. 1, a connector apparatus, generally designated 10, is shown to include a header connector, generally designated 12, mounted on a printed circuit board 14. Generally, header connector 12 receives an IC card 16 inserted through a stamped and formed metal guide 18 into a mating end 20 of the header connector. An ejector mechanism, generally designated 22, is mounted about header connector 12 for ejecting IC card 16 from the header connector.

Figure 2A:
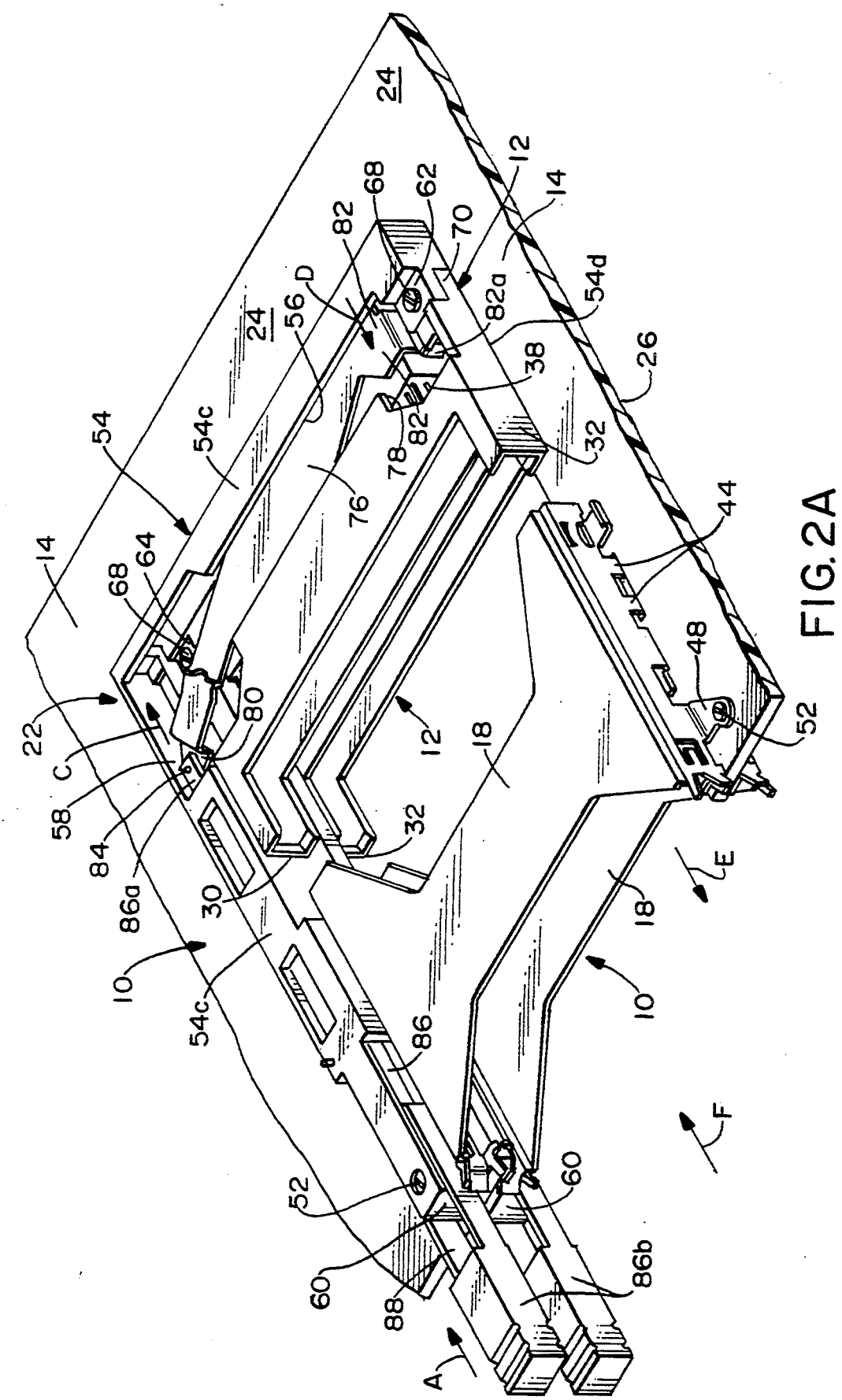
FIG. 2A is a perspective view of one of the connector apparatus and ejector mechanism assemblies mounted on each side of a printed circuit board, with the push-buttons of both assemblies on the left as viewed in a direction along arrow "F"

Referring to FIG. 2A in conjunction with FIG. 1, one of the connector apparatus 10 is mounted on each opposite side of printed circuit board 14 which can be considered to have a top surface 24 and a bottom surface 26. One of the connector apparatus is mounted on each of the top and bottom surfaces of the printed circuit board as seen in FIG. 2A. However, for purposes of describing a single connector apparatus 10, reference is made to the top apparatus fully visible in FIG. 2A in conjunction with FIG. 1.

More particularly, header connector 12 includes a terminating end 28 opposite mating end 20, along with first and second opposite sides 30 and 32, respectively, extending between the ends. A pair of guide grooves 34 are provided on the insides of opposite sides 30 and 32 for guiding a leading edge 36 of IC card 16 into mating end 20 of the header connector. As is well known in the art, a transverse array of socket terminals (not shown) along leading edge 36 of IC card 16 electrically interconnect with an associated array of pin terminals 38 extending through a connector section 40 of the header connector. Although not visible in the drawings, pin terminals 28 have pin portions within mating end 20 for insertion into the socket terminals along edge 36 of the IC card. The terminals have tail portions for insertion into plated-through holes 41 or connection to surface mount traces (not shown) on printed circuit board 14 to effect an electrical connection to the board.

Stamped and formed metal guide 18 includes a pair of side flanges 42 having tabs 44 insertable into slots 46 in printed circuit board 14. This properly positions the guide relative to the board and header connector 12. The guide also has a pair of apertured ears 48 for alignment with holes 50 in the printed circuit board and for receiving a pair of fasteners 52 for securing the guide to the board.

Ejector mechanism 22 includes a one-piece unitarily molded, generally L-shaped ejector frame, generally designated 54. The L-shaped configuration thereby defines a base leg 54a and a side leg 54b. The ejector frame further has an upper surface 54c and a lower surface 54d. An inwardly directed groove 56 is formed in base leg 54a generally facing header connector 12. A channel 58 is formed in side leg 54b. A slide block 60 is formed on the distal end of side leg 54b. A pair of mounting ears 62 and 64 project inwardly of base leg 54a, and the mounting ears have apertures 66 therethrough for receiving fasteners 68.

L-shaped ejector frame 54 is adapted for mounting to printed circuit board 14 about header connector 12 as seen in FIG. 2A. In the configuration shown, base leg 54a of the ejector frame is disposed alongside the rear of terminating end 28 of the header connector. The header connector has apertured mounting ears 70 and 72 which align with mounting ears 62 and 64, respectively, of the ejector frame for receiving fasteners 68 therethrough to conjointly mount the ejector frame and the header connector to the printed circuit board. The left-hand fastener 52 (as viewed in a direction along arrow "F") described above in relation to securing metal guide 18 to the printed circuit board, also passes through a hole 74 in slide block 60 at the distal end of side leg 54b of the ejector frame to conjointly mount the frame and the metal guide to the printed circuit board.

An eject lever 76 is mounted in groove 56 of ejector frame 54 and also in a groove 78 along terminating end 28 of header connector 12. The eject lever has a first lever end 80 and a second lever end 82 provided with a projection 82a. The projection at the second lever end of the eject lever is adapted to engage and eject IC card 16 from header connector 12. A pin 84 is insertable through first lever end 80, for purposes described below.

An elongated push-rod 86 is reciprocally mounted in channel 58 within side leg 54b of ejector frame 54. The push-rod has a guide groove 88 for receiving slide block 60 at the distal end of side leg 54b of the ejector frame. The push-rod has a first or inner end 86a with a hole 90 therethrough for receiving pin 84 to pivotally connect the inner end of the push-rod with first lever end 80 of eject lever 76. A second or outer rod end 86b defines a push-button for manual actuation to effect pivoting of eject lever 76 and consequent ejection of IC card 16. The eject lever has a pivot boss 76a (FIG. 1) which engages within groove 56 of ejector frame leg 54a to allow pivoting of the lever thereabout. In essence, manual pushing of push-button 86b causes push-rod 86 to linearly move in the direction of arrow "A" within channel 58 of ejector frame leg 54b. With the inner end of the push-rod pivotally connected to end 80 of eject lever 76 by means of pin 84, that end of the eject lever will pivot in the direction of arrow "C" (FIG. 2A). This will effect pivotal movement of the opposite end 82 of the eject lever in the direction of arrow "D" in FIG. 2A. Projection 82a (FIG. 1) will engage leading edge 36 of IC card 16 and eject the IC card out of the apparatus in the direction of arrow "E" (FIG. 2A).

Figure 2B:
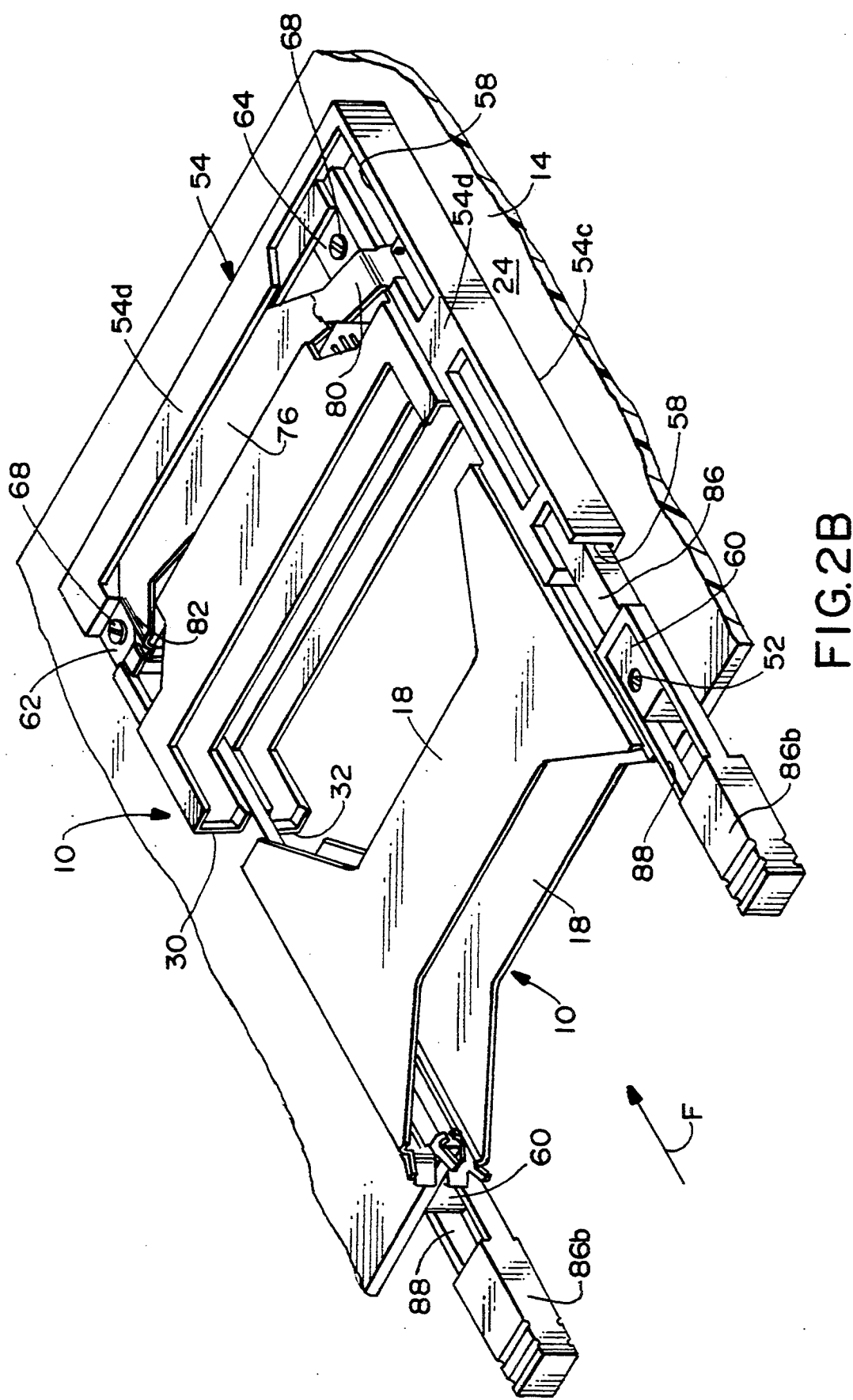
FIG. 2B is a view similar to that of FIG. 2A, but with the ejector mechanism for the top assembly oriented with the push-button on the right side thereof.
Figure 4:
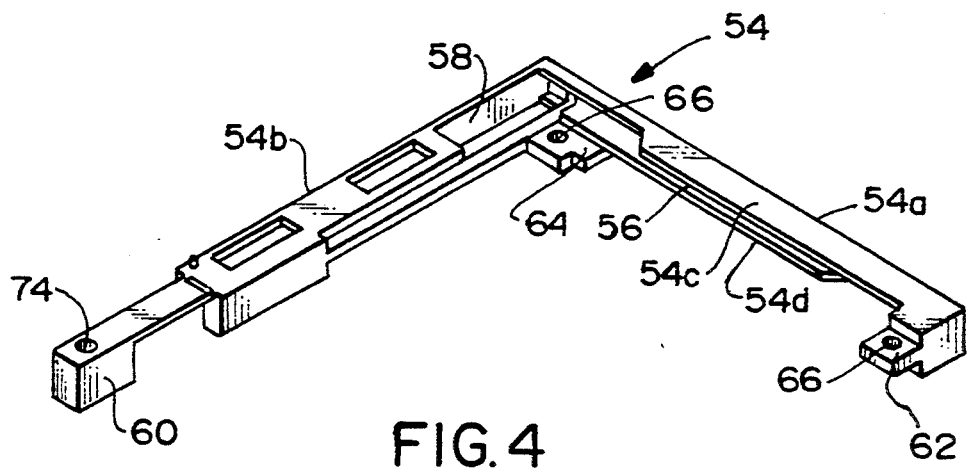
FIG. 4 is a perspective view of the ejector frame.
Figure 5:
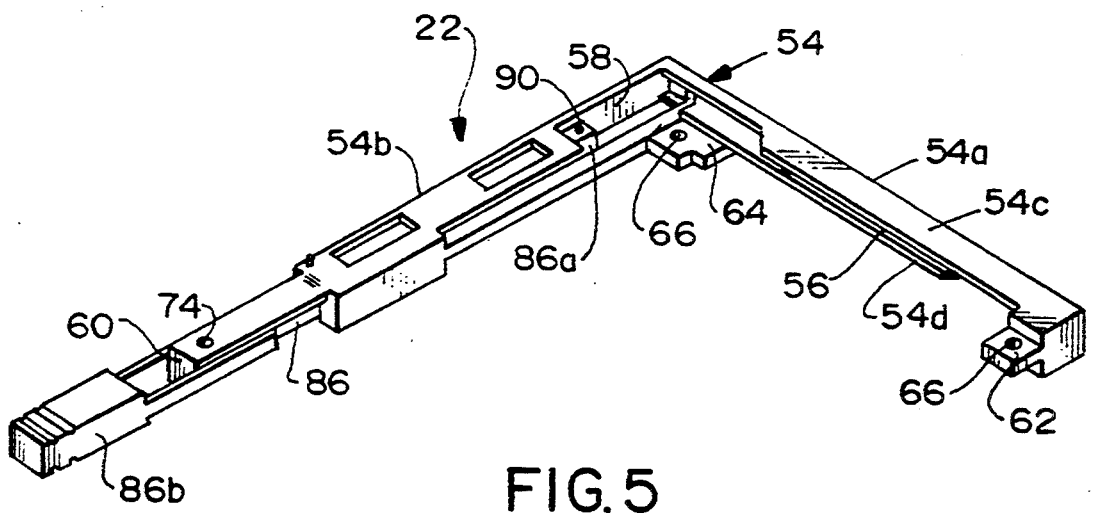
FIG. 5 is a perspective view of the ejector frame as shown in FIG. 4, with the push-rod assembled thereto.

Before proceeding with the other drawings to illustrate the "universal" aspects of the invention, referring to FIGS. 3A-5 in conjunction with FIGS. 1-2B, it first should be understood or observed that upper and lower faces 54c and 54d define an overall given thickness of ejector frame 54. Channel 58 for receiving push-rod 86 is located entirely between the upper and lower faces of the ejector frame. The construction and dimensions of push-rod 86, including push-button 86b, are such as to be disposed entirely within the given thickness of the ejector frame as defined by its upper and lower faces. Therefore, the ejector frame and push-rod can be mounted on printed circuit board 14 with either the upper face or the lower face of the ejector frame mounted to the printed circuit board. Still further, mounting ears 62 and 64 of the ejector frame are located generally centrally between the upper and lower faces of the ejector frame, as is quite clearly shown by mounting ear 62 in FIGS. 1 and 2A. Therefore, the mounting ears will be located the same distance from the printed circuit board regardless of whether the ejector frame is mounted to the board with its upper or lower face oriented up or down. Regardless of the orientation, the mounting ears will be alignable and interengageable with mounting ears 70 and 72 of header connector 12 for receiving fasteners 68. The same is true for slide block 60 which receives one of the fasteners 52. It does not make any difference whether the slide block faces up or down as to its ability to receive the fastener and secure the ejector frame to the printed circuit board in one or the other of holes 50 through the board.

With the understandings set forth immediately above, a comparison now is made between FIGS. 2A and 2B. No new reference numerals are added in any of these figures because all of the components shown therein are identical to the above detailed description. However, note in FIG. 2A that ejector frame 54 is mounted on the top surface 24 of printed circuit board 14 with the lower face 54d of the ejector frame mounted on the printed circuit board and the upper face 54c of the ejector frame facing upwardly. Now, reference is made to FIG. 2B wherein it can be seen that ejector frame 54, along with push-rod 86, has been flipped over so that its "upper" face 54c (i.e. upper face in FIG. 2A) is mounted to the top surface 24 of printed circuit board 14, while the "lower" face 54d (i.e. lower face in FIG. 2A) of the ejector frame faces upwardly. FIG. 2A shows the top connector apparatus 10 with ejector frame 54 and push-rod 86 in a configuration which can be called a "left-hand" configuration with push-button 86b at the left of the apparatus as viewed in a direction along arrow "F". FIG. 2B shows the ejector frame and push-rod in a configuration which can be called a "right-hand" orientation, with push-button 86b at the right of the apparatus as viewed in a direction along arrow "F". The only modification whatsoever that is necessary to convert the connector apparatus from a left-hand orientation to a right-hand orientation is to change the construction of the simple stamped and formed metal eject lever 76 so that its eject end is reversed. Otherwise, all of the components of the connector apparatus mounted to top face 24 of printed circuit board 14 in either FIGS. 2A or 2B are identical, including ejector frame 54, push-rod 86, header connector 12 and guide 18.

Both FIGS. 2A and 2B show a second connector apparatus 10 mounted to bottom surface 26 of printed circuit board 14 in a "left-hand" orientation. In essence, ejector frame 54 and push-rod 86 are mounted to the bottom surface of the printed circuit board in the identical relative orientation as is shown on the top of the board in FIG. 2B.

Figure 6:
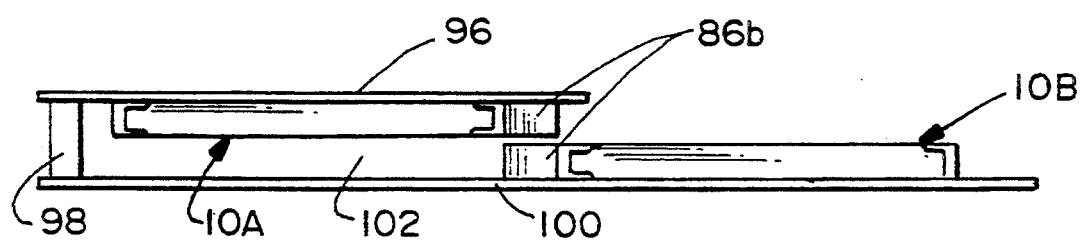
FIG. 6 is a somewhat schematic end elevational view of a pair of connector apparatus/ejector mechanism assemblies mounted respectively on a pair of spaced printed circuit boards, with the push-buttons of the ejector mechanisms in vertical alignment.

The versatility of "universal" ejector frame 54 and push-rod 86 can be imagined. For instance, FIG. 6 shows a "right-hand" connector apparatus 10A mounted to the underside of a printed circuit board 96 which is spaced by a spacer 98 above a second printed circuit board 100. A "left-hand" connector apparatus 10B is mounted to the top of printed circuit board 100. It can be seen that push-buttons 86b of the ejector mechanisms of the two oppositely oriented connector apparatus are in vertical alignment and closely adjacent to each other. Such a system might be used, for instance, where a space 102 is required below connector apparatus 10A for mounting circuit components on top of printed circuit board 10, but to keep the push-buttons of the ejector mechanisms in close juxtaposition.

Figure 7:
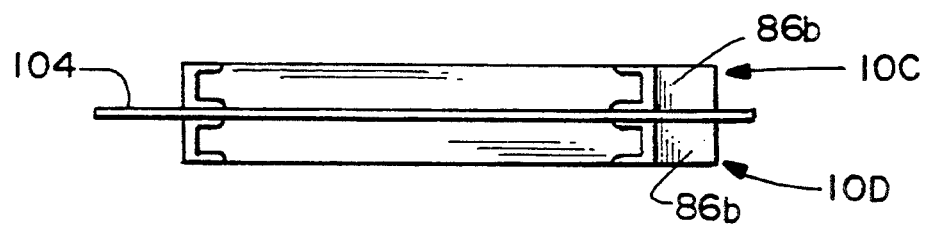
FIG. 7 is a somewhat schematic end elevational view of two assemblies mounted on opposite sides of a printed circuit board, with the push-buttons of both assemblies being right-hand oriented.

FIG. 7 shows a system wherein two right-hand apparatus 10C and 10D are mounted on opposite sides of a printed circuit board 104. This system generally is just the opposite of that shown in FIG. 2A wherein two "left-hand" apparatus are mounted on opposite sides of printed circuit board 14. In all three systems shown in FIGS. 2A, 6 and 7, the push-buttons 86b of the two apparatus in each depiction are in vertical alignment or close proximity.

Figure 8:
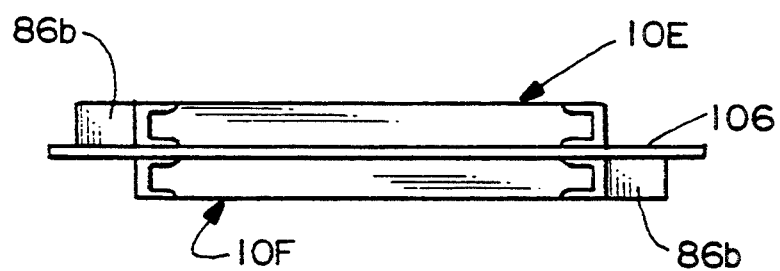
FIG. 8 is a view similar to that of FIG. 7, with the push-button of the bottom assembly being left-hand oriented.

Lastly, FIG. 8 shows an end elevational view of a "left-hand" apparatus 10E mounted on the top surface of a printed circuit board 106, and a "right-hand" apparatus 10F mounted to the bottom surface of the board. Of course, push-button 86b of the top apparatus 10E is at the left side thereof, and push-button 86b of apparatus 10F is at the right side thereof. In essence, the system shown in FIG. 8 simply is the opposite of that shown in FIG. 2B.

In each system or configuration shown in FIG. 1, or FIG. 2A, or FIG. 2B, or FIG. 6, or FIG. 7, or FIG. 8, ejector frame 54 and push-button 86 are identical in construction. It is readily apparent that a huge savings in manufacturing costs and inventory maintenance are afforded by the invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an ejector mechanism (22) for ejecting an IC card (16) from a header connector (12) mounted on a printed circuit board (14), the ejector mechanism including
   a generally L-shaped ejector frame (54) having an upper face (54c) and a lower face (54d), and being mountable about the header connector (12) in a first position on its lower face, wherein an integrally formed channel (58) of the ejector frame is located along one side (30) of the header connector,
   an eject lever (76) pivotally mounted on the ejector frame and having a first lever end (80) and a second lever end (82), wherein the second lever end has a projection (82a) adapted to eject the IC rack from the header connector, and
   an elongated push rod (86) reciprocally mounted within the integrally formed channel of the ejector frame and having a first rod end (86a) pivotally associated with first lever end of the eject lever and a second rod end (86b) adapted for manual actuation for effecting pivoting of the eject lever and ejection of the IC card,
   wherein the improvement comprises:
   the ejector frame is mountable in a second position about the header connector (12) on its upper face (54c),
   wherein the integrally formed channel of the ejector frame is located on an opposite side (32) of the header connector.

2. In an ejector mechanism as set forth in claim 1, wherein the ejector frame and the header connector have complementary interengaging mounting means for mounting the frame and the header connector to the printed circuit board, the mounting means being interengageable in either of said first and second positions of the ejector frame.

3. In an ejector mechanism as set forth in claim 1, further comprising means for mounting the ejector frame in said first and second positions.

4. In an ejector mechanism as set forth in claim 1, wherein said upper and lower faces of the ejector frame define a given thickness of the frame, and said push-rod is constructed and dimensioned to be disposed entirely within said given thickness.

5. In an ejector mechanism as set forth in claim 1, wherein said ejector frame is a one-piece structure unitarily molded of plastic material.

6. In an ejector mechanism as set forth in claim 1, wherein said channel is constructed and dimensioned to be located entirely between the upper and lower faces of the ejector frame.

7. In an ejector mechanism as set forth in claim 6, wherein said upper and lower faces of the ejector frame define a given thickness of the frame, and said push-rod is constructed and dimensioned to be disposed entirely within said given thickness.

8. In an ejector mechanism (22) mounted on a printed circuit board (14) for ejecting a memory card (16) from a header connector (12), including a generally L-shaped ejector frame (54) having:
   an upper face (54c);
   a lower face (54d) opposite the upper face and defining a first mounting face including mounting means (60, 62, 64) for mounting the frame in a first position about the header connector;
   a side leg (54b) mounted generally on one side (30) of the header connector and adapted to receive a reciprocally-mounted actuator arm (86); and
   a base leg (54a) mounted generally parallel to the header connector and adapted to mount an eject lever (76) generally adjacent the upper face;
   wherein the improvement comprises:
   the upper face (54c) defining a second mounting face including mounting means (60, 62, 64) for mounting the frame in a second position about the header connector, wherein the side leg (54b) is mounted generally on the opposite side (32) of the header connector (12),
   whereby the ejector frame (54) and push-rod (86) can be used as either a "right-hand" or a "left-hand" ejector mechanism without altering the header connector.

9. In an ejector mechanism as set forth in claim 8, wherein said ejector frame has a given thickness, and said push-rod is constructed and dimensioned to be disposed entirely within said given thickness.

10. In an ejector mechanism as set forth in claim 8, wherein the ejector frame and the header connector have complementary interengaging mounting means which are engageable regardless of the mounting position of the ejector frame.

* * * * *